(12) United States Patent
Wang et al.

(10) Patent No.: US 11,438,549 B2
(45) Date of Patent: Sep. 6, 2022

(54) JOINT USE OF FACE, MOTION, AND UPPER-BODY DETECTION IN GROUP FRAMING

(71) Applicant: Polycom, Inc., San Jose, CA (US)

(72) Inventors: Tianran Wang, Beijing (CN); Wenxue He, Beijing (CN); Lidan Qin, Beijing (CN); Hai Xu, Beijing (CN)

(73) Assignee: POLY, INC., San Jose, CA (US)

( * ) Notice: Subject to any disclaimer, the term of this patent is extended or adjusted under 35 U.S.C. 154(b) by 0 days.

(21) Appl. No.: 17/294,568

(22) PCT Filed: Nov. 22, 2018

(86) PCT No.: PCT/CN2018/116923
§ 371 (c)(1),
(2) Date: May 17, 2021

(87) PCT Pub. No.: WO2020/103078
PCT Pub. Date: May 28, 2020

(65) Prior Publication Data
US 2022/0006974 A1 Jan. 6, 2022

(51) Int. Cl.
*H04N 7/15* (2006.01)
*G06V 40/10* (2022.01)
(Continued)

(52) U.S. Cl.
CPC ............... *H04N 7/15* (2013.01); *G06T 7/20* (2013.01); *G06V 40/10* (2022.01); *H04L 12/1822* (2013.01); *H04L 65/1083* (2013.01)

(58) Field of Classification Search
CPC ......... G06T 7/20; G06V 40/10; H04L 65/403; H04L 12/1822; H04N 7/15; H04N 7/147
(Continued)

(56) References Cited

U.S. PATENT DOCUMENTS

| 9,942,518 B1 | 4/2018 | Tangeland et al. |
| 2009/0015658 A1 | 1/2009 | Enstad et al. |

(Continued)

FOREIGN PATENT DOCUMENTS

| CN | 102282847 | 12/2011 |
| CN | 106165406 | 4/2018 |

(Continued)

OTHER PUBLICATIONS

International Search Report and Written Opinion in co-pending PCT/CN2018/116923, dated Apr. 23, 2019, 9 pages.
(Continued)

*Primary Examiner* — Melur Ramakrishnaiah (57) ABSTRACT

A videoconferencing endpoint is described that uses a combination of face detection, motion detection, and upper body detection for selecting participants of a videoconference for group framing. Motion detection is used to remove fake faces as well as to detect motion in regions around detected faces during postprocessing. Upper body detection is used in conjunction with the motion detection in postprocessing to allow saving faces that have been initially detected by face detection for group framing even if the participant has turned away from the camera, allowing the endpoint to keep tracking the participants region better than would be possible based only on an unstable result coming from face detection.

21 Claims, 6 Drawing Sheets

(51) Int. Cl.
  *G06T 7/20* (2017.01)
  *H04L 12/18* (2006.01)
  *H04L 65/1083* (2022.01)

(58) Field of Classification Search
  USPC .......................................... 348/14.01–14.16
  See application file for complete search history.

(56) References Cited

U.S. PATENT DOCUMENTS

| | | |
|---|---|---|
| 2014/0049595 A1 | 2/2014 | Feng et al. |
| 2015/0296178 A1* | 10/2015 | Aarrestad .............. H04N 7/147 |
| | | 348/14.16 |
| 2018/0300540 A1 | 10/2018 | Swisher et al. |
| 2019/0058833 A1* | 2/2019 | Goonetilleke ......... G06V 10/22 |
| 2019/0356883 A1* | 11/2019 | Theien ................... H04N 7/147 |

FOREIGN PATENT DOCUMENTS

| | | |
|---|---|---|
| WO | 2010/059481 | 5/2010 |
| WO | 2015/157201 | 10/2015 |

OTHER PUBLICATIONS

Bertrand, Frederic, Extended European Search Report dated Jun. 29, 2022, EP Patent Application No. 18940967.5, European Patent Office, Jun. 29, 2022.

\* cited by examiner

JOINT USE OF FACE, MOTION, AND UPPER-BODY DETECTION IN GROUP FRAMING

TECHNICAL FIELD

The present invention relates to the field of videoconferencing, and in particular to a technique for group framing by a videoconferencing endpoint.

BACKGROUND ART

Group framing is used in videoconferencing to identify a group of participants in a videoconference. In part, group framing depends upon detecting faces of the participants. However, in some devices, faces in the images received from the camera of the videoconferencing endpoint are very small. When the size of a face is below 20 pixels, face detection is hard to do and a negative face detection rate increases in a way that is obvious to participants. In addition, participants in the video conference may move and may not always face the camera. This has made the group view unstable, further decreasing the user experience.

SUMMARY OF INVENTION

In one aspect, a method of framing a group of participants in a videoconference, comprises receiving video data from a camera of a videoconferencing endpoint; performing face detection on the video data; saving detected faces for a first threshold time period; postprocessing the saved detected faces during the first threshold time period, comprising: performing a first type of motion detection on regions around the saved detected faces; performing upper body detection on regions around the saved detected faces responsive to not detecting motion; and discarding saved detected faces responsive to the first type of motion detection and upper body detection detecting neither motion nor an upper body in the regions around the saved detected faces; and framing the group of participants based on the saved detected faces.

In a second aspect, a videoconferencing endpoint comprises a housing; a camera, disposed in the housing; a processing unit, disposed in the housing and coupled to the camera; a memory, disposed in the housing and coupled to the processing unit and the camera, in which are stored instructions for performing face detection and upper body detection, comprising instructions that when executed cause the processing unit to: receive video data from the camera corresponding to participants of a videoconference; perform face detection on the video data; save detected faces for a first threshold time period; postprocess the saved detected faces during the first threshold time period, comprising instructions that when executed cause the processing unit to: perform a first type of motion detection on regions around the saved detected faces; perform upper body detection on regions around the saved detected faces responsive to not detecting motion; and discard saved detected faces responsive to the first type of motion detection and upper body detection detecting neither motion nor an upper body in the regions around the saved detected faces; and frame a group of participants of the videoconference based on the saved detected faces.

In a third aspect, a videoconferencing endpoint configured for group framing of participants in a videoconference comprises a means for receiving video data from a camera of a videoconferencing endpoint; a means for performing face detection on the video data; a means for saving detected faces for a first threshold time period; a means for postprocessing the saved detected faces during the first threshold time period, comprising: a means for performing a first type of motion detection on regions around the saved detected faces; a means for performing upper body detection on regions around the saved detected faces responsive to not detecting motion; and a means for discarding saved detected faces responsive to the first type of motion detection and upper body detection detecting neither motion nor an upper body in the regions around the saved detected faces; and a means for framing a group of participants based on the saved detected faces.

In a fourth aspect, a machine readable medium includes instructions, that when executed cause a videoconferencing endpoint to perform the methods of the first aspect.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one."

As used herein, the term "or" means any of the alternatives and any combination of the alternatives, including all of the alternatives, unless the alternatives are explicitly indicated as mutually exclusive.

As used herein, the phrase "at least one of" when combined with a list of items, means a single item from the list or any combination of items in the list. The phrase does not require all of the listed items unless explicitly so defined.

As used herein, the term "a computer system" can refer to a single computer or a plurality of computers working together to perform the function described as being performed on or by a computer system.

As used herein, the term "couple" or "couples" means either an indirect or direct wired or wireless connection. Thus, if a first device couples to a second device, that connection may be through a direct connection or through an indirect connection via other devices and connections. The term "based on" means "based at least in part on." Therefore, if X is based on Y, X may be a function of Y and any number of other factors.

As used herein, the term "processing unit" can refer to a single hardware processing unit or a plurality of hardware processing units that together may be programmed to perform the indicated actions. The hardware processing units may be implemented as virtual hardware processing units of a virtual programmable device hosted on a physical hardware device. Instructions that when executed program the processing unit to perform an action may program any or all of the processing unit to perform the indicated action. Where the processing unit is one or more multi-core processors, instructions that when executed program the processing unit to perform an action may program any or all of the multiple cores to perform the indicated action.

As used herein, the term "medium" can refer to a single physical medium or a plurality of media that together store the information described as being stored on the medium.

As used herein, the term "memory" can refer to a single memory device or a plurality of memory devices that together store the information described as being stored on the medium. The memory may be any type of storage device, including random access memory, read-only memory, optical and electromechanical disk drives, etc.

As disclosed below, by employing motion detection and upper body detection in addition to face detection, group framing can be improved. Motion detection was often used to check "fake faces" such as faces in pictures or on walls or something that is not real face of a videoconference participant. Motion detection has also been used to do postprocessing for group framing. But simple motion detection often failed under some circumstances and complicated motion detection couldn't be applied to all devices because of the high processing load. Similarly, body detection has been used to restrict the region of face detection to speed up face detection before. But the low body detection rate may make body detection ineffective for that purpose.

As disclosed below in more detail, a better group framing technique is based on a combination of face detection, motion detection and upper-body detection techniques. A different motion detection mode may be used for different purposes: strict mode to check fake faces and normal mode for postprocessing. Postprocessing involves trying to get the right faces as much as possible. In strict mode, the checking region is smaller and the condition is stricter. In addition, the threshold to decide the movement of one pixel varies with the luminance value of the pixel.

In addition, upper body detection is used to postprocess because although motion detection is effectual, it has low accuracy under some circumstances. The upper body detection uses deep learning techniques and the positive detection rate of it can reach more than 85%. Use of upper body detection can remedy the disadvantages that arise with motion detection. To improve the performance of the upper body detection, only the region around the faces which were previously detected are used when applying body detection. Therefore, the processing load and the time cost can be very little. The joint use of motion detection and upper body detection makes postprocessing more effective.

Figure 1:
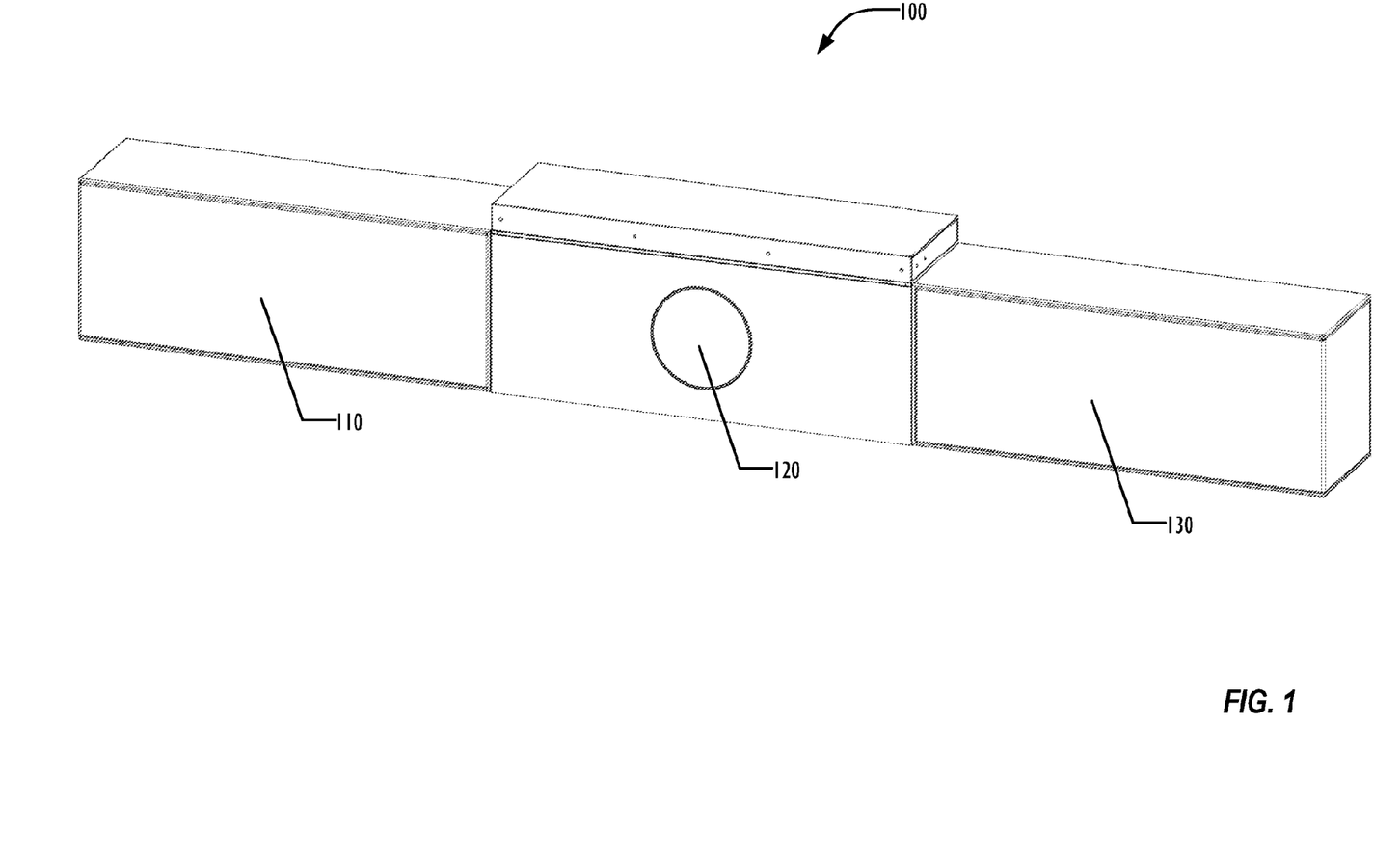
FIG. 1 is an isometric view illustrating a videoconferencing endpoint according to one embodiment.

Turning now to FIG. 1, at least one embodiment of a videoconferencing endpoint as described herein is an integral device 100 that includes stereo loudspeakers 110 and 130, at least one high resolution camera 120, and at least one microphone array. The stereo loudspeakers 110, 130 are preferably of high quality. The high-quality stereo speakers 110, 130 are spaced to produce a good spatial audio image.

In one embodiment, the integral device 100 includes a housing that is a long, thin bar, which is removably attachable to a top or bottom of a display device, such as a high definition television monitor. The positions of the components of the integral device 100 are fixed within the device.

The integral device 100 can include a wireless or wired network interface for management of device operations. The wireless or wired network interface can also be used to transmit analytics derived from one or more framing algorithms. These analytics can include, but are not limited to, the number of people in the room, the number of different speakers during the duration of a call, and the estimated seating positions of each person at an endpoint. In one embodiment, the integral device also includes a universal serial bus (USB) interface to transmit similar information over this connection to an external processing unit.

In one embodiment, the integral device 100 includes stereo pickup microphones configured to produce a high-quality stereo audio image for transmission to one or more remote endpoints. The microphone array can be used to accurately determine the location of a person who is talking. The stereo pickup microphones can be part of the microphone array(s) or can be separate from the microphone array(s). A face detection module can frame a group of people without audio. A face detection module can work in conjunction with the microphone array(s) to produce a zoomed-in view of the person talking.

In one embodiment, the high-resolution camera 120 is an Electronic Pan Tilt Zoom (EPTZ) camera with a wide field-of-view that enables the integral device 100 to both to detect people at the endpoint and to electronically zoom in to frame a group of people or to frame an individual talker.

In one embodiment, an external microphone array (not shown in FIG. 1) can be removably connected to the integral device 100. In one embodiment, the external microphone array can be wirelessly coupled to the integral device 100. The external pickup microphone array can be placed closer to conference participants to capture clearer audio from talkers than would be collected by the pickup microphones.

Figure 2:
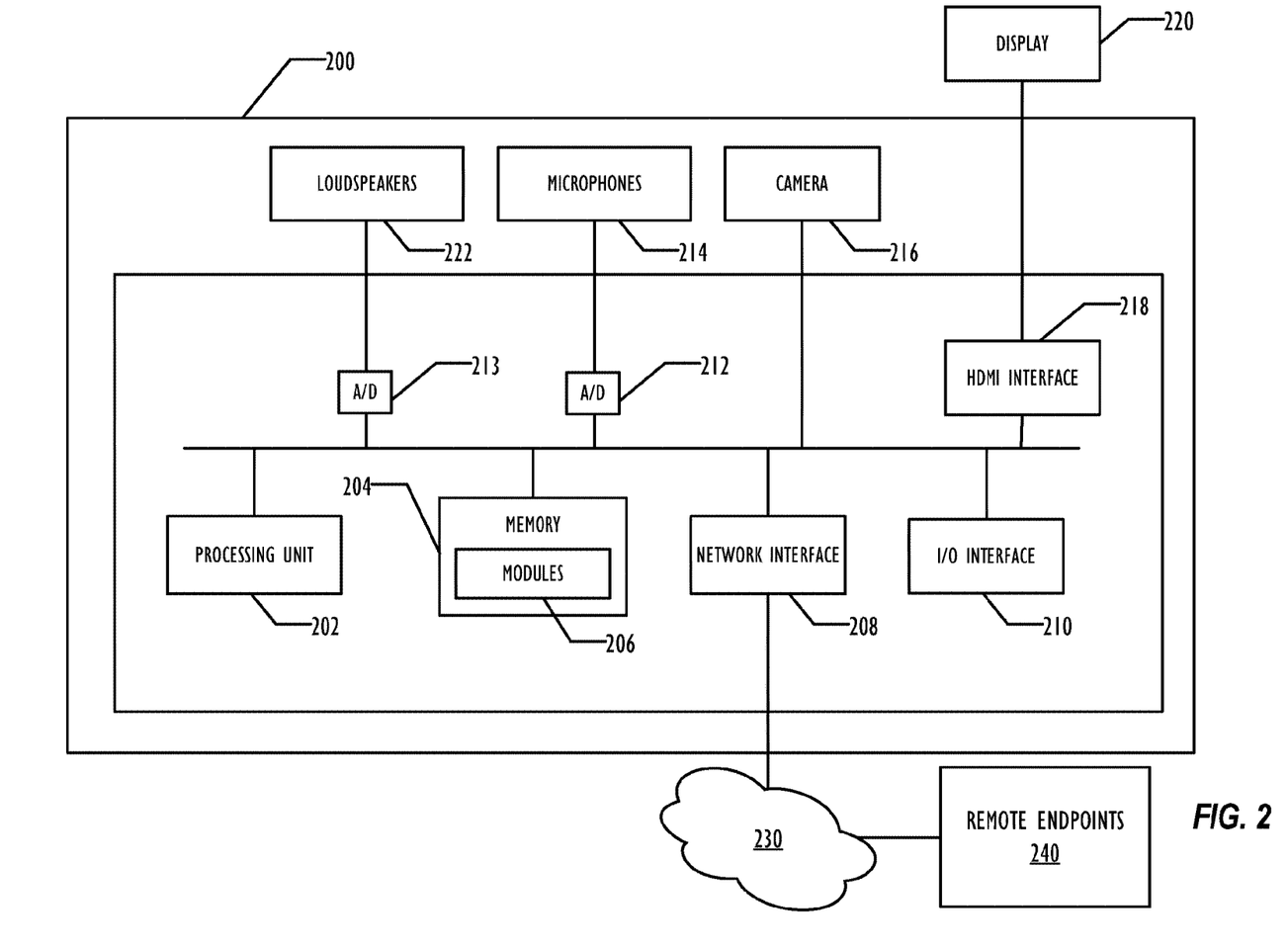
FIG. 2 is a block diagram illustrating the components of a videoconferencing endpoint according to one embodiment.

FIG. 2 is a block diagram of a video conference endpoint 200 according to one embodiment. The video conference endpoint 200 could be the integral device 100 of FIG. 1. A processing unit 202, such as a DSP or central processor unit (CPU) or combination thereof, is present to perform the desired audio and video operations. The upper body, face, and motion detection techniques described below allow the processing unit 202 to be a low processing power unit. In one embodiment, the processing unit 202 is a Qualcomm Snapdragon® 625 CPU. (SNAPDRAGON is a registered trademark of Qualcomm, Inc.) A memory 204, which includes programs to perform desired modules 206, such as an upper body detection module, a face detection module, a motion detection module, and audio processing modules as well as various video modules, is connected to the processing unit 202. Although illustrated as a bus type connection, any type of connections can be used, including point to point connections.

A network interface 208, such as an Ethernet interface, is connected to the processing unit 202 to allow communication with one or more remote endpoints 240 in the video conference. An input/output (I/O) interface 210 is connected to the processing unit 202 to perform any needed I/O operations. An A/D converter block 212 is connected to the processing unit 202 and to microphones 214. The microphones 214 include an omnidirectional microphone and a directional microphone or microphones. Similarly, at least two loudspeakers 222 are connected to the processing unit 202 via an A/D converter 213. A camera 216 is connected to the processing unit 202 to provide near end video. A High-Definition Multimedia Interface (HDMI®) interface or other type video interface 218 is connected to the processing unit 202 and to an external display 220 to provide video and/or audio output. (HDMI is a registered trademark of HDMI Licensing, LLC.) FIG. 2 is a very simplified diagram of a video conference system endpoint and many other designs are possible, all of which can perform the upper body and face detection operations described below.

The videoconferencing endpoint 200 communicates with the one or more remote endpoints 240 across one or more networks 230.

After capturing audio and video with the microphones 214 and camera 216, the endpoint 200 encodes it using any of the common encoding standards, such as MPEG-1, MPEG-2, MPEG-4, H.261, H.263, H.264, G729, and G711. Then, the network interface 208 outputs the encoded audio and video to the remote endpoints 240 via the network 230 using any appropriate protocol. Similarly, the network interface 208 receives conference audio and video via the network 230 from the remote endpoints 240 and sends these to codecs for processing. Eventually, the loudspeakers 222 output conference audio, and a display 220 outputs conference video. In one embodiment, the display 220 is an external display, such as a monitor display, coupled to an integral unit such as integral device 100 via an HDMI or other wired or wireless technique. Many of these modules and other components can operate in a conventional manner well known in the art so that further details are not provided here.

Figure 3:
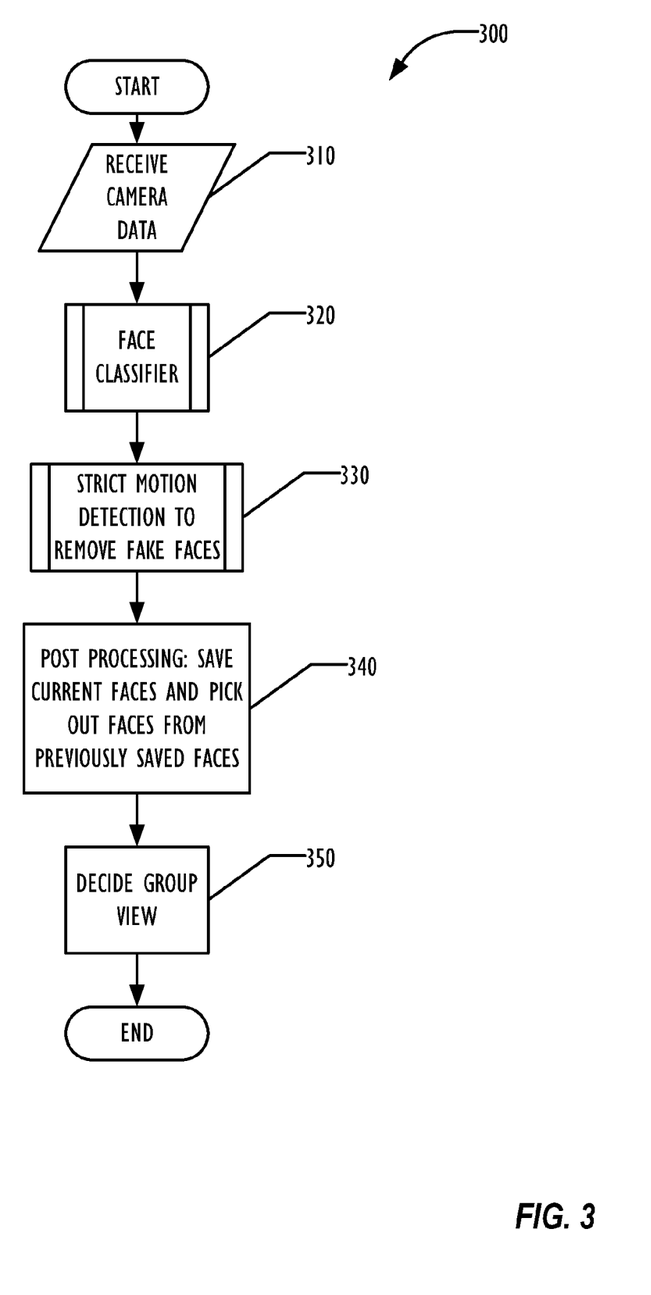
FIG. 3 is a block diagram illustrating a technique for group framing according to one embodiment.

FIG. 3 is a high level flowchart illustrating a technique 300 for improved group framing using a combination of face detection, motion detection, and upper body detection. In block 310, camera data is received from the camera 216. Face detection is then performed in block 320 using a neural network technique such as the one described in FIG. 5. In block 330, a strict motion detection technique is used to eliminate fake face artifacts, such as faces in a painting or other items that may be detected as a face, but because of lack of motion in the face, can be determined not to be the face of a participant in the videoconference.

Strict motion detection can remove most of the fake faces, but when strict motion fails and some fake faces pass through to postprocessing, upper body detection and normal motion detection in postprocessing can remove those previously uncaught fake faces.

Once fake faces have been removed, a post processing technique saves the faces that were detected in block 320, retrieves previously saved faces, then uses a normal motion detection and upper body detection technique to determine which faces to continue to include in the group framing. Finally, in block 350, group framing is performed based on the faces determined in block 340.

Any motion detection technique may be used for performing motion detection. Although referred to herein as strict motion detection and normal motion detection, the same motion detection technique may be used for both strict and normal, with different parameters and thresholds used to detect motion, with strict motion detection using parameters or thresholds that impose stricter conditions on what will be detected as motion. Unlike some motion detection techniques, both the strict and normal mode of motion detection described herein use a threshold for pixel comparison that varies based on luminance, with a higher threshold used in environments where the luminance is higher.

The face detection and upper body detection techniques may employ deep learning models, with an input layer, an output layer, and a plurality of hidden layers in between the input and output layers. For training the models, undistorted training data may be collected from an open source database, such as the MegaFace database available from the University of Washington. However, because the EPTZ camera 120 in the integral device 100 is a wide-angle camera, which can introduce distortion in the images collected, training data preferably includes similarly distorted image data, collected using a camera similar to the camera 120. Because the MegaFace data is designed for face detection, preferably the bounding box of the face is enlarged to include the upper body, thus allowing the MegaFace data to be used for upper body training data, too. Further, additional upper body training images, such as low resolution 12×12 pixel upper body images may be used as training data. Embodiments of the face detection and upper body detection models are implemented as Convolutional Neural Network (CNN) models, but other embodiments may use other types of deep learning models.

Figure 4:
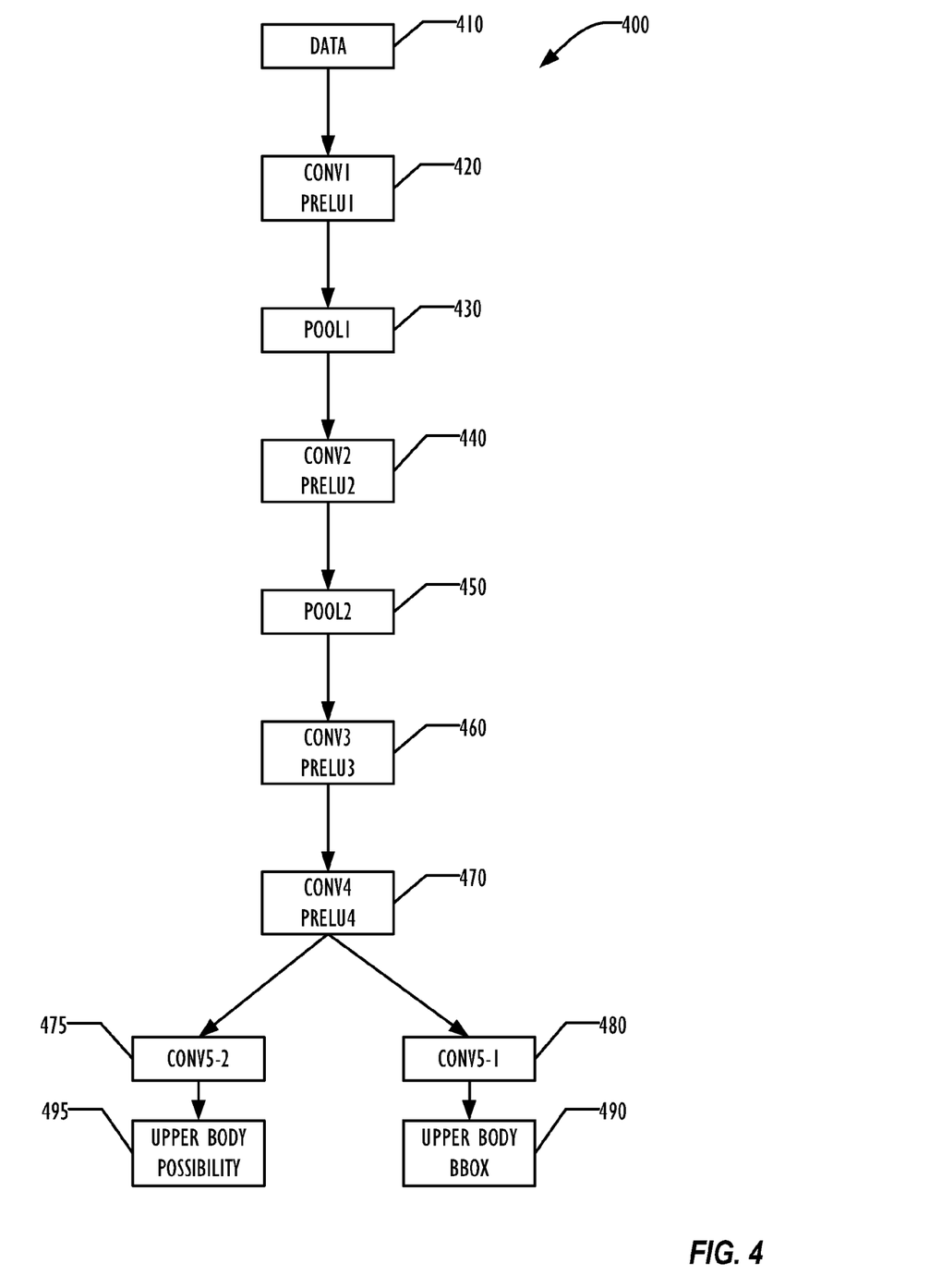
FIG. 4 is a block diagram illustrating a deep learning model for use in upper body detection according to one embodiment.

In one embodiment, the camera 120 is a 4K camera, but the system is configured to downconvert the video data input to the first model in FIG. 4 to 720P video data for ease of computation.

FIG. 4 is a block diagram illustrating example layers of an upper body detection 400 according to one embodiment. In this model, input is provided to the model in block 410, passing the data to block 420, which comprises a convolutional layer and a PReLU layer. Block 430 then processes the results of block 420 with a pooling layer, the results of which are provided as input in block 440 to a second convolutional layer and a second PReLU layer. Then in block 450 a second pooling layer is provided, followed in block 460 by a third convolutional layer and a third PReLU layer. In block 470 a fourth convolution layer and fourth PReLU layer process the results from block 450, passing their results to two convolutional layers 475 and 480. Convolutional layer 475 produces the probability of upper bodies, output in output layer 495, and convolutional layer 480 produces output that corresponds to upper bodies. Finally, the results are output in output layer 490 as upper body bounding boxes. In one embodiment, the upper body detection output from the model may have an accuracy of above 85% with a recall also above 85%. Using a common face detection data set and benchmark such as the FDDB dataset from the Computer Vision Laboratory of the University of Massachusetts at vis-www.cs.umass.edu, one embodiment of the upper body detection model can achieve approximately 90% accuracy.

Figure 5:
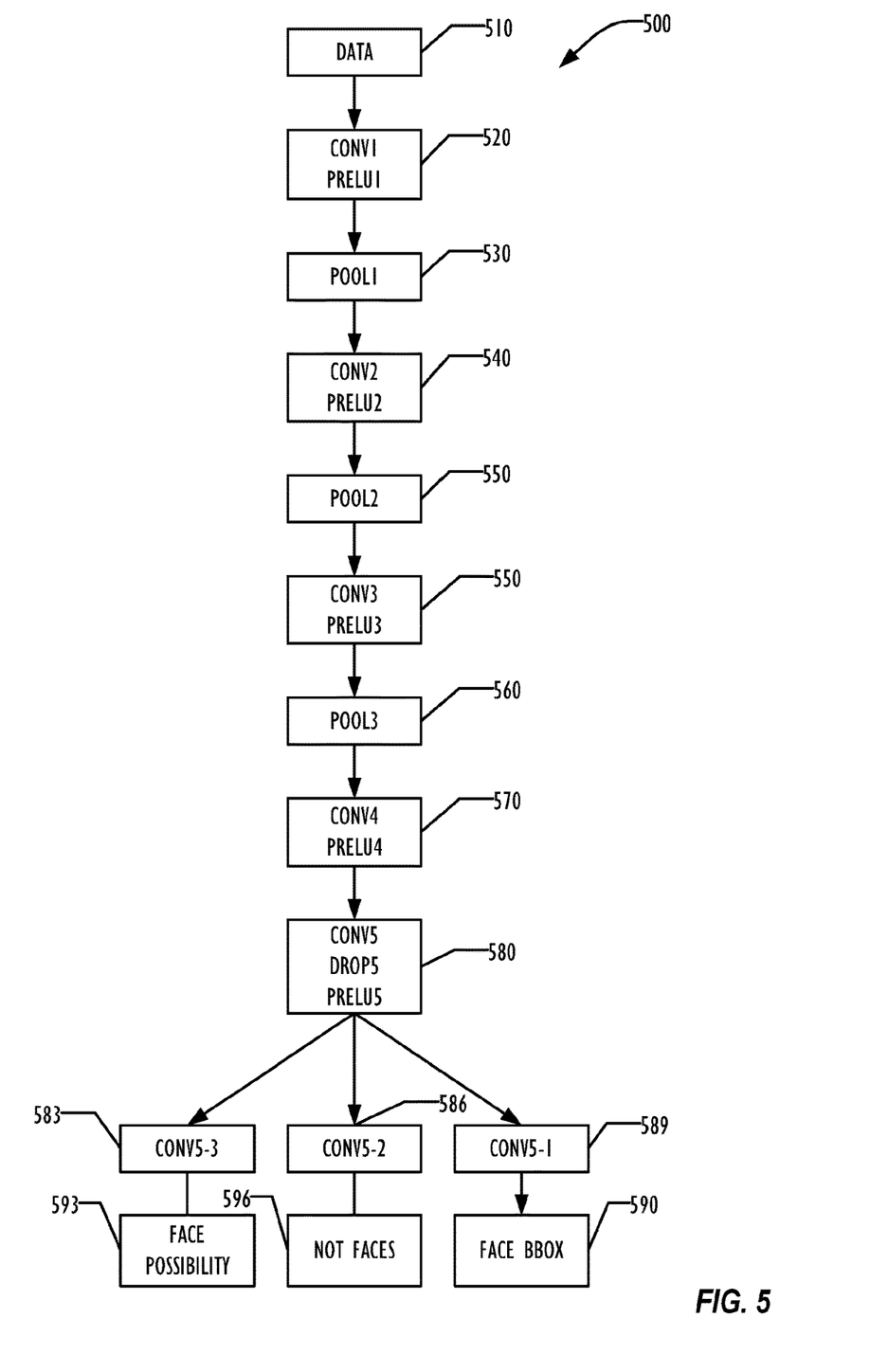
FIG. 5 is a block diagram illustrating a deep learning model for use in face detection according to one embodiment.

FIG. 5 is a block diagram illustrating a face detection model 500 according to one embodiment. Because upper bodies generally have fewer features than faces, face detection is always more accurate than upper body detection. Thus some faces may be lost from the second model's results. To avoid ignoring faces that could be detected in the data, the third model may use the results from the second model with a lower probability threshold than was used to generate the upper body bounding boxes. While doing so in an upper body detection model might result in incorrect upper body detections, the third model is focused on face detection and can refine the upper body detection results. In one embodiment, the images processed by the third model are faces with 48×48 pixel resolution, using both faces from an open database such as Megaface as well as distorted faces that correspond to the distortion introduced by the camera 216.

The third model begins in block 510 with the upper body data, allowing the model to consider only those areas detected as upper bodies. In embodiments in which a fourth model further analyses the upper body data for head detection, the input data in block 510 may be restricted to just those areas detected or identified as heads.

In block 520, a first convolutional layer and a first PReLU layer process the input data, followed in block 530 by a first pooling layer. The results of the first pooling layer are then processed by a second convolution layer and a second PReLU layer in block 540, followed by a second pooling layer in block 550. In block 560, a third convolutional layer and a third PReLU layer process the data from block 550, followed by a third pooling layer in block 560. In block 570, a fourth convolutional layer and a fourth PReLU layer process the data, followed in block 580 by a fifth convolutional layer, a dropout layer, and first PReLU layer. The results of block 580 are then processed by three convolutional layers in blocks 583, 586, and 589. Block 589 results in detected faces, while block 583 results in the probability of detected faces in output layer 593 and 586 produce results for images that are not faces in output layer 596. Finally, in output layer 590, the face bounding blocks are output. In one embodiment, the third model results in face detection bounding boxes with approximately 92% accuracy, with high speed and comparatively low computational requirements.

The particular layers of the models illustrated in FIGS. 4-5 are illustrative and by way of example only. Other embodiments may have other hidden layers of the models as desired. Because one of skill in the art of neural network would understand the design of neural networks, no further discussion of the models is considered necessary.

Figure 6:
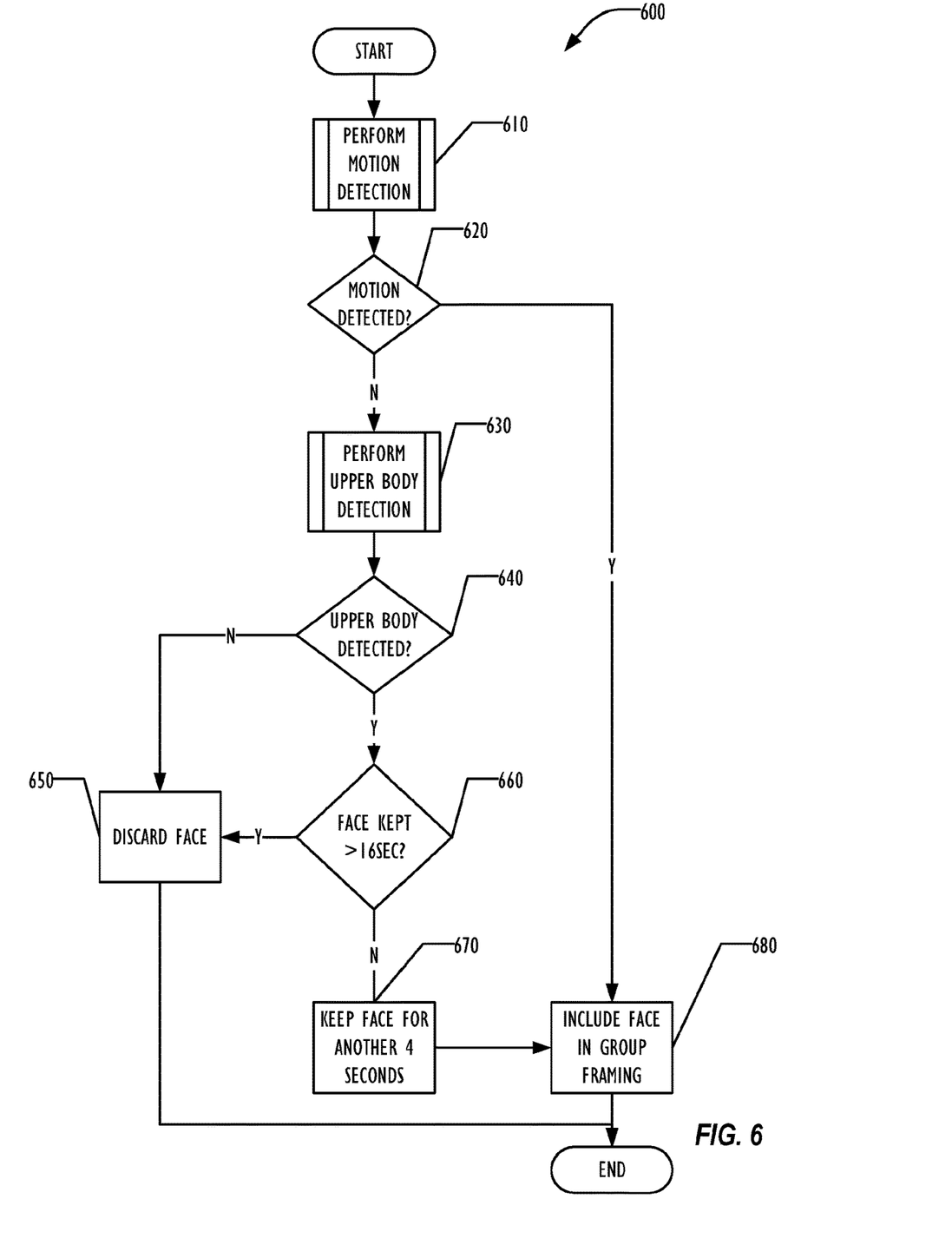
FIG. 6 is a flowchart illustrating a technique for postprocessing detected faces according to one embodiment.

FIG. 6 is a flowchart illustrating a technique 600 for postprocessing faces according to one embodiment. For the first threshold time period after a face is detected, normal motion detection is performed in block 610 to determine if the saved faces still exist. In one embodiment, the first threshold time period is 4 seconds, but other threshold periods can be used.

In normal motion detection, the region around the saved face is considered, which is a bigger region than the original face region. In block 620, if motion is detected around the saved face, the face still exists and should be picked out for the group framing decision. If no motion is detected around the saved face, then in block 630 upper body detection is performed.

In block 640, if an upper body was not detected, then the saved face no longer exists in the image and is discarded in block 650. If an upper body was detected, if the face has been saved for more than a second threshold time period as determined in block 660, the face is too stale and should be discarded in block 650. In one embodiment, the second threshold time period is 16 seconds, but other threshold time periods can be used as desired.

If in block 660 the saved face has not been kept for more than the second threshold time period, then in block 670 the face may be kept for another first threshold time period.

Finally, in block 680, if motion was detected around the saved face or an upper body was detected around the saved face and the saved face has not been kept too long, the saved face is sent for group framing in block 680.

In embodiments where upper body detection can reach of successful positive detection rate of 95%, motion detection may be omitted, and the second threshold can be increased.

Thus, the techniques outlined above can detect use a combination of face detection, motion detection, and upper body detection to provide improved group framing of video conferencing participants. The effect of the combined face, motion, and upper body detection techniques helps ensure that all of the faces framed in a group view have been detected at least once during some time period. The technique is very flexible, and can be retrained to meet different environments. Because of the use of upper body detection, in some cases the technique can even detect people who are initially captured facing the camera, but then face away from the camera.

Although described above in terms of identifying faces for group framing, the techniques are not limited to group framing, and can be applied to any application that uses face detection, to allow a better determination of when a face that has been detected should still be considered present.

The following examples pertain to further embodiments:

Example 1 is a method of framing a group of participants in a videoconference, comprising: receiving video data from a camera of a videoconferencing endpoint; performing face detection on the video data; saving detected faces for a first threshold time period; postprocessing the saved detected faces during the first threshold time period, comprising: performing a first type of motion detection on regions around the saved detected faces; performing upper body detection on regions around the saved detected faces responsive to not detecting motion; and discarding saved detected faces responsive to the first type of motion detection and upper body detection detecting neither motion nor an upper body in the regions around the saved detected faces; and framing the group of participants based on the saved detected faces.

In Example 2 the subject matter of Example 1 optionally includes further comprising: performing a second type of motion detection on the detected faces; and eliminating faces from the detected faces responsive to detecting no motion in the detected faces.

In Example 3 the subject matter of Example 2 optionally includes wherein where the second type of motion detection is stricter than the first type of motion detection.

In Example 4 the subject matter of any of Examples 1-3 optionally includes wherein the first type of motion detection employs a higher threshold for pixel comparison in areas of higher luminance.

In Example 5 the subject matter of any of Examples 1-3 optionally includes wherein postprocessing the saved detected faces further comprises: keeping a saved detected face of the saved detected faces for an additional first threshold time period responsive to detecting upper bodies in the regions around the saved detected face.

In Example 6 the subject matter of any of Examples 1-3 optionally includes wherein postprocessing the saved detected faces comprises: discarding saved detected faces after a second threshold time period, greater than the first threshold time period.

In Example 7 the subject matter of any of Examples 1-3 optionally includes wherein the regions around the saved faces are bigger than the saved detected faces.

Example 8 is a videoconferencing endpoint, comprising: a housing; a camera, disposed in the housing; a processing unit, disposed in the housing and coupled to the camera; a memory, disposed in the housing and coupled to the processing unit and the camera, in which are stored instructions for performing face detection and upper body detection, comprising instructions that when executed cause the processing unit to: receive video data from the camera corresponding to participants of a videoconference; perform face detection on the video data; save detected faces for a first threshold time period; postprocess the saved detected faces during the first threshold time period, comprising instructions that when executed cause the processing unit to: perform a first type of motion detection on regions around the saved detected faces; perform upper body detection on regions around the saved detected faces responsive to not detecting motion; and discard saved detected faces responsive to the first type of motion detection and upper body detection detecting neither motion nor an upper body in the regions around the saved detected faces; and frame a group of participants of the videoconference based on the saved detected faces.

In Example 9 the subject matter of Example 8 optionally includes further comprising: performing a second type of motion detection on the detected faces; and eliminating faces from the detected faces responsive to detecting no motion in the detected faces.

In Example 10 the subject matter of Example 9 optionally includes wherein where the second type of motion detection is stricter than the first type of motion detection.

In Example 11 the subject matter of any of Examples 8-9 optionally includes wherein the first type of motion detection employs a higher threshold for pixel comparison in areas of higher luminance.

In Example 12 the subject matter of any of Examples 8-9 optionally includes wherein postprocessing the saved detected faces further comprises: keeping a saved detected face of the saved detected faces for an additional first threshold time period responsive to detecting upper bodies in the regions around the saved detected face.

In Example 13 the subject matter of any of Examples 8-9 optionally includes wherein postprocessing the saved detected faces comprises: discarding saved detected faces after a second threshold time period, greater than the first threshold time period.

In Example 14 the subject matter of any of Examples 8-9 optionally includes wherein the regions around the saved faces are bigger than the saved detected faces.

Example 15 is a videoconferencing endpoint configured for group framing of participants in a videoconference, comprising: a means for receiving video data from a camera of a videoconferencing endpoint; a means for performing face detection on the video data; a means for saving detected faces for a first threshold time period; a means for postprocessing the saved detected faces during the first threshold time period, comprising: a means for performing a first type of motion detection on regions around the saved detected faces; a means for performing upper body detection on regions around the saved detected faces responsive to not detecting motion; and a means for discarding saved detected faces responsive to the first type of motion detection and upper body detection detecting neither motion nor an upper body in the regions around the saved detected faces; and a means for framing a group of participants based on the saved detected faces.

In Example 16 the subject matter of Example 15 optionally includes further comprising: a means for performing a second type of motion detection on the detected faces; and a means for eliminating faces from the detected faces responsive to detecting no motion in the detected faces, wherein where the second type of motion detection is stricter than the first type of motion detection.

In Example 17 the subject matter of any of Examples 15-16 optionally includes wherein the first type of motion detection employs a higher threshold for pixel comparison in areas of higher luminance.

In Example 18 the subject matter of any of Examples 15-16 optionally includes wherein postprocessing the saved detected faces further comprises: keeping a saved detected face of the saved detected faces for an additional first threshold time period responsive to detecting upper bodies in the regions around the saved detected face.

In Example 19 the subject matter of any of Examples 15-16 optionally includes wherein postprocessing the saved detected faces comprises: discarding saved detected faces after a second threshold time period, greater than the first threshold time period.

In Example 20 the subject matter of any of Examples 15-16 optionally includes wherein the regions around the saved faces are bigger than the saved detected faces.

Example 21 is a machine readable medium including instructions, that when executed cause a videoconferencing endpoint to perform the methods of Examples 1-7.

Embodiments may be implemented in one or a combination of hardware, firmware, and software. Embodiments may also be implemented as instructions stored on a computer-readable storage medium, which may be read and executed by at least one processing element to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media.

Embodiments, as described herein, may include, or may operate on, logic or a number of components, modules, or mechanisms. Modules may be hardware, software, or firmware communicatively coupled to one or more processing elements in order to carry out the operations described herein. Modules may be hardware modules, and as such, modules may be considered tangible entities capable of performing specified operations and may be configured or arranged in a certain manner. Circuits may be arranged (e.g., internally or with respect to external entities such as other circuits) in a specified manner as a module. The whole or part of one or more programmable devices (e.g., a stand-alone client or server computer system) or one or more hardware processing elements may be configured by firmware or software (e.g., instructions, an application portion, or an application) as a module that operates to perform specified operations. The software may reside on a computer readable medium. The software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Where modules are temporarily configured, each of the modules need not be instantiated at any one moment in time. For example, where the modules comprise a general-purpose hardware processing element configured using software; the general-purpose hardware processing element may be configured as respective different modules at different times. Software may accordingly program a hardware processor, for example, to constitute a particular module at one instance of time and to constitute a different module at a different instance of time. Modules may also be software or firmware modules, which operate to perform the methodologies described herein.

The above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A method of framing a group of participants in a videoconference, comprising:
   receiving video data from a camera of a videoconferencing endpoint;
   performing face detection on the video data;
   saving detected faces for a first threshold time period;
   postprocessing the saved detected faces during the first threshold time period, wherein postprocessing the saved detected faces comprises:
      performing a first type of motion detection on regions around the saved detected faces;
      performing upper body detection on regions around the saved detected faces responsive to not detecting motion; and
      discarding saved detected faces responsive to the first type of motion detection and upper body detection detecting neither motion nor an upper body in the regions around the saved detected faces; and
      framing the group of participants based on the saved detected faces.

2. The method of claim 1, further comprising:
   performing a second type of motion detection on the detected faces; and
   eliminating faces from the detected faces responsive to detecting no motion in the detected faces.

3. The method of claim 2, wherein where the second type of motion detection is stricter than the first type of motion detection.

4. The method of claim 1, wherein the first type of motion detection employs a higher threshold for pixel comparison in areas of higher luminance.

5. The method of claim 1, wherein postprocessing the saved detected faces further comprises:
   keeping a saved detected face of the saved detected faces for an additional first threshold time period responsive to detecting upper bodies in the regions around the saved detected face.

6. The method of claim 1, wherein postprocessing the saved detected faces further comprises:
   discarding saved detected faces after a second threshold time period, greater than the first threshold time period.

7. The method of claim 1, wherein the regions around the saved faces are bigger than the saved detected faces.

8. A videoconferencing endpoint, comprising:
   a housing;
   a camera, disposed in the housing;
   a processing unit, disposed in the housing and coupled to the camera;
   a memory, disposed in the housing and coupled to the processing unit and the camera, in which are stored instructions for performing face detection and upper body detection, comprising instructions that when executed cause the processing unit to:
      receive video data from the camera corresponding to participants of a videoconference;
      perform face detection on the video data;
      save detected faces for a first threshold time period;
      postprocess the saved detected faces during the first threshold time period, wherein the instructions to cause the processing unit to postprocess the saved detected faces comprise instructions that when executed cause the processing unit to:
         perform a first type of motion detection on regions around the saved detected faces;
         perform upper body detection on regions around the saved detected faces responsive to not detecting motion; and
         discard saved detected faces responsive to the first type of motion detection and upper body detection detecting neither motion nor an upper body in the regions around the saved detected faces; and
         frame a group of participants of the videoconference based on the saved detected faces.

9. The videoconferencing endpoint of claim 8, the memory further comprising instructions that when executed cause the processing unit to:
   perform a second type of motion detection on the detected faces; and
   eliminate faces from the detected faces responsive to detecting no motion in the detected faces.

10. The videoconferencing endpoint of claim 9, wherein where the second type of motion detection is stricter than the first type of motion detection.

11. The videoconferencing endpoint of claim 8, wherein the first type of motion detection employs a higher threshold for pixel comparison in areas of higher luminance.

12. The videoconferencing endpoint of claim 8, wherein the instructions to cause the processing unit to postprocess the saved detected faces further comprise instructions that when executed cause the processing unit to:
   keep a saved detected face of the saved detected faces for an additional first threshold time period responsive to detecting upper bodies in the regions around the saved detected face.

13. The videoconferencing endpoint of claim 8, wherein the instructions to cause the processing unit to postprocess the saved detected faces comprise instructions that when executed cause the processing unit to:
   discard saved detected faces after a second threshold time period, greater than the first threshold time period.

14. The videoconferencing endpoint of claim 8, wherein the regions around the saved faces are bigger than the saved detected faces.

15. A non-transitory machine readable medium including instructions that when executed cause a processing unit of a videoconferencing endpoint to perform the method of:
   receiving video data from a camera of a videoconferencing endpoint;
   performing face detection on the video data;
   saving detected faces for a first threshold time period;
   postprocessing the saved detected faces during the first threshold time period, wherein postprocessing the saved detected faces comprises:
      performing a first type of motion detection on regions around the saved detected faces;
      performing upper body detection on regions around the saved detected faces responsive to not detecting motion; and
      discarding saved detected faces responsive to the first type of motion detection and upper body detection detecting neither motion nor an upper body in the regions around the saved detected faces; and
      framing the group of participants based on the saved detected faces.

16. The non-transitory machine readable medium of claim 15, the method further comprising:
   performing a second type of motion detection on the detected faces; and
   eliminating faces from the detected faces responsive to detecting no motion in the detected faces.

17. The non-transitory machine readable medium of claim 16, wherein where the second type of motion detection is stricter than the first type of motion detection.

18. The non-transitory machine readable medium of claim 15, wherein the first type of motion detection employs a higher threshold for pixel comparison in areas of higher luminance.

19. The non-transitory machine readable medium of claim 15, wherein postprocessing the saved detected faces further comprises:
   keeping a saved detected face of the saved detected faces for an additional first threshold time period responsive to detecting upper bodies in the regions around the saved detected face.

20. The non-transitory machine readable medium of claim 15, wherein postprocessing the saved detected faces further comprises:
   discarding saved detected faces after a second threshold time period, greater than the first threshold time period.

21. The non-transitory machine readable medium of claim 15, wherein the regions around the saved faces are bigger than the saved detected faces.

* * * * *